US010190493B2

(12) United States Patent
Hill et al.

(10) Patent No.: US 10,190,493 B2
(45) Date of Patent: Jan. 29, 2019

(54) EVALUATION OF THE DELIVERY AND EFFECTIVENESS OF ENGINE PERFORMANCE CHEMICALS AND PRODUCTS

(71) Applicant: Illinois Tool Works Inc., Glenview, IL (US)

(72) Inventors: Travis Hill, Katy, TX (US); Tsao-Chin Clarence Huang, Katy, TX (US); Ronald L. Fausnight, Spring, TX (US); Martin William Rosas, Katy, TX (US)

(73) Assignee: Illinois Tool Works Inc., Glenview, IL (US)

( * ) Notice: Subject to any disclaimer, the term of this patent is extended or adjusted under 35 U.S.C. 154(b) by 124 days.

(21) Appl. No.: 15/296,619

(22) Filed: Oct. 18, 2016

(65) Prior Publication Data

US 2017/0114716 A1 Apr. 27, 2017

Related U.S. Application Data

(60) Provisional application No. 62/245,780, filed on Oct. 23, 2015.

(51) Int. Cl.

| | |
|---|---|
| ***G01M 15/04*** | (2006.01) |
| ***F02B 77/04*** | (2006.01) |
| ***F02M 35/08*** | (2006.01) |
| ***F02M 35/10*** | (2006.01) |
| ***F02M 35/024*** | (2006.01) |
| ***F02M 37/00*** | (2006.01) |

(52) U.S. Cl.
CPC ........... *F02B 77/04* (2013.01); *F02M 35/024* (2013.01); *F02M 35/08* (2013.01); *F02M 35/1038* (2013.01); *F02M 35/10072* (2013.01); *F02M 35/10386* (2013.01); *F02M 37/0047* (2013.01)

(58) Field of Classification Search
USPC ............... 73/114.31, 114.32, 114.33, 114.37, 73/114.77, 114.79
See application file for complete search history.

(56) References Cited

U.S. PATENT DOCUMENTS 5,355,713 A * 10/1994 Scourtes ............... G01M 15/09 73/114.76
5,492,006 A * 2/1996 Beckett ................. G01M 15/08 73/114.01

(Continued)

*Primary Examiner* — Eric S McCall
(74) *Attorney, Agent, or Firm* — Avery N. Goldstein; Blue Filament Laww PLLC

(57) ABSTRACT

A method is provided for evaluating the delivery and effectiveness of engine performance chemicals and products for reducing intake valve deposits for gasoline direct injection and port fuel injection engines. The engine evaluation tool provides the ability to repeatedly quantify the relative improvements between engine performance and maintenance products through a series of tests in a controlled environment with parameters that simulate intake valve and combustion chamber conditions of an engine. Non-limiting examples of test engine parameters illustratively include air fuel ratio, intake air flow, temperature of sample, oscillation frequency, presentation angle of replaceable sample, and product delivery method that includes throttle body upstream, port vacuum in plenum, and by fuel injector.

17 Claims, 14 Drawing Sheets

(56) References Cited

U.S. PATENT DOCUMENTS

| | | | | |
|---|---|---|---|---|
| 9,885,335 | B2 * | 2/2018 | Thompson | F02P 17/02 |
| 2002/0170344 | A1 * | 11/2002 | Pallozzi | G01M 15/02 73/116.02 |
| 2005/0022587 | A1 * | 2/2005 | Tentrup | G01M 13/025 73/116.06 |
| 2005/0044933 | A1 * | 3/2005 | Laws | G01L 3/24 73/114.24 |
| 2007/0256478 | A1 * | 11/2007 | Guadagnola | G01M 3/3254 73/40 |
| 2008/0229836 | A1 * | 9/2008 | Melz | G01M 7/06 73/669 |
| 2011/0282598 | A1 * | 11/2011 | Ungermann | F02D 41/0002 702/51 |
| 2013/0291550 | A1 * | 11/2013 | Weinzierl | F02C 9/26 60/776 |
| 2014/0182548 | A1 * | 7/2014 | Thompson | G01M 15/11 123/406.19 |
| 2016/0138484 | A1 * | 5/2016 | Nielsen | F01L 3/08 73/114.79 |

* cited by examiner

EVALUATION OF THE DELIVERY AND EFFECTIVENESS OF ENGINE PERFORMANCE CHEMICALS AND PRODUCTS

RELATED APPLICATIONS

This application claims priority of provisional application Ser. No. 62/245,780 filed 23 Oct. 2015, the contents of which are hereby incorporated by reference.

FIELD OF THE INVENTION

The present invention relates to the technical field of combustion engines, and in particular to a method and system for evaluating the delivery and effectiveness of engine performance chemicals and products for reducing intake valve deposits for gasoline direct injection and port fuel injection engines.

BACKGROUND OF THE INVENTION

Fuel injection refers to a system for admitting fuel into an internal combustion engine, and has become the primary fuel delivery system used in automotive engines, having replaced carburetors. The primary difference between carburetors and fuel injection is that fuel injection atomizes the fuel through a small nozzle under high pressure, while a carburetor relies on suction created by intake air accelerated through a Venturi tube to draw the fuel into the airstream. Modern fuel injection systems are designed specifically for the type of fuel being used. Some systems are designed for multiple grades of fuel (using sensors to adapt the tuning for the fuel currently used). Most fuel injection systems are for gasoline or diesel applications.

Benefits of fuel injection include smoother and more consistent transient throttle response, such as during quick throttle transitions, easier cold starting, more accurate adjustment to account for extremes of ambient temperatures and changes in air pressure, more stable idling, decreased maintenance needs, and better fuel efficiency. Fuel injection also dispenses with the need for a separate mechanical choke, which on carburetor-equipped vehicles must be adjusted as the engine warms up to normal temperature. Fuel injection systems are also able to operate normally regardless of orientation, whereas carburetors with floats are not able to operate upside down or in zero gravity, such as encountered on airplanes. Fuel injection generally increases engine fuel efficiency. Exhaust emissions are cleaner because the more precise and accurate fuel metering reduces the concentration of toxic combustion byproducts leaving the engine, and because exhaust cleanup devices such as the catalytic converter can be optimized to operate more efficiently since the exhaust is of consistent and predictable composition.

Gasoline direct injection (GDI) is a variant of fuel injection employed in modern two-stroke and four-stroke gasoline engines, where the gasoline is highly pressurized, and injected via a common rail fuel line directly into the combustion chamber of each cylinder as shown in FIG. 1B, as opposed to conventional multi-point fuel injection that injects fuel into the intake tract, or cylinder port (FIG. 1A). Directly injecting fuel into the combustion chamber requires high pressure injection whereas low pressure is used injecting into the intake tract or cylinder port.

A problem encountered with fuel injection systems is the buildup of carbon deposits on the inlet side (top) of the intake valves. The deposits create turbulence and can restrict airflow into the cylinders causing performance and driveability problems including hesitation, stumbling, misfiring, and hard starting. The thicker the carbon deposit buildup on the valves, the worse the driveability problems. While many fuels have additives to clean intake valves these additives are ineffective for GDI based engines, since GDI sprays fuel directly into the combustion chamber, as shown in FIG. 1B, so the fuel completely bypasses the intake valves. Consequently, detergents and cleaners that are added to gasoline to prevent intake valve deposits from forming in port fuel injection engines never have a chance to do their job in a GDI engine. The inlet side of the intake valves are never in direct contact with the fuel so the detergents cannot wash away the deposits. Because of this, fuel detergent additives that are either in gasoline from the refinery or are added to the fuel tank have almost no effect on preventing or removing intake valve deposits in GDI engines. The additives work in regular port fuel injected engines, but not GDI engines.

Thus, there exists a need for a method and system for evaluating the delivery and effectiveness of engine performance chemicals and products for reducing intake valve deposits for gasoline direct injection and port fuel injection engines.

SUMMARY OF THE INVENTION

A method is provided for evaluating the delivery and effectiveness of engine performance chemicals and products for reducing intake valve deposits for gasoline direct injection and port fuel injection engines. Embodiments of the inventive engine evaluation tool provide the ability to repeatedly quantify the relative improvements between engine performance and maintenance products through a series of tests in a controlled environment with parameters that simulate intake valve and combustion chamber conditions of an engine. Non-limiting examples of test engine parameters available with embodiments of the invention illustratively include air fuel ratio, intake air flow, temperature of sample, oscillation frequency, presentation angle of replaceable sample, and product delivery method that includes throttle body upstream, port vacuum in plenum, and by fuel injector.

Embodiments of the inventive engine evaluation tool provide the ability to test multiple upstream manifold and port geometries. Non-limiting examples of test engine adjustable variables that may be controlled with embodiments of the invention include temperature range, oscillation frequency, air flow range/air-fuel ratio, and sample presentation angle range. In addition, embodiments of the invention provide programmable duty cycle logic. In a specific embodiment programmable duty cycles illustratively include idle, low speed, and full throttle. In specific inventive embodiments automated delivery controls for aerosol applications are provided.

A system is provided for the evaluation of the delivery and effectiveness of engine performance chemicals and products for reducing intake valve deposits for gasoline direct injection and port fuel injection engines.

BRIEF DESCRIPTION OF THE DRAWINGS

The present invention is further detailed with respect to the following figures that depict various aspects of the present invention.

DETAILED DESCRIPTION OF THE PREFERRED EMBODIMENTS

The present invention has utility as a method and system for evaluating the delivery and effectiveness of engine performance chemicals and products for reducing intake valve deposits for gasoline direct injection and port fuel injection engines. Embodiments of the inventive engine evaluation tool provide the ability to repeatedly quantify the relative improvements between engine performance and maintenance products through a series of tests in a controlled environment with parameters that simulate intake valve and combustion chamber conditions of an engine. Non-limiting examples of test engine parameters available with embodiments of the invention illustratively include air fuel ratio, intake air flow, temperature of sample, oscillation frequency, presentation angle of replaceable sample, and product delivery method that includes throttle body upstream, port vacuum in plenum, and by fuel injector.

Embodiments of the inventive engine evaluation tool may be implemented as a test stand that verify the efficiency of a particular additive in removing carbon deposits from a test specimen with pre-defined carbon content. Electrical controls are implemented in embodiments of the test stand to monitor and control system parameters illustratively including temperature, pressure, humidity, and proportions of fuel, air, additive mixture, etc. In embodiments of the invention the test stand may be configured with a graphical user interface (GUI) and user controls to configure or monitor system parameters.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Figure 1:
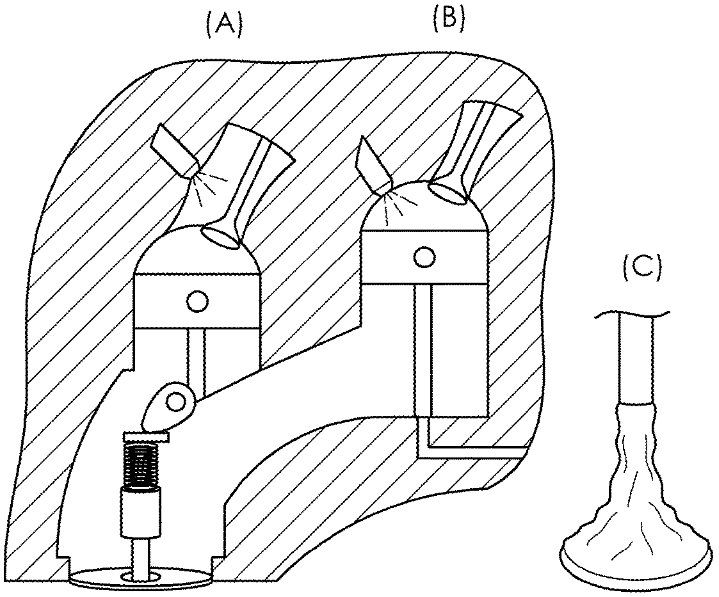
FIGS. 1A-1C illustrate a fuel injected port cylinder a gasoline direct injection (GDI) cylinder, and a valve with carbon deposits, respectively.
Figure 2:
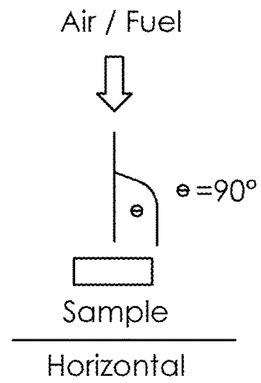
FIG. 2 illustrates the range of the primary air/fuel charge delivery angle used during the implementation of embodiments of the invention.

Embodiments of the inventive engine evaluation tool provide the ability to test multiple upstream manifold and port geometries. In a specific embodiment the primary air/fuel charge delivery angle may be set between 90° to horizontal as shown in FIG. 2. Non-limiting examples of test engine adjustable variables that may be controlled with embodiments of the invention include temperature range, oscillation frequency, air flow range/air-fuel ratio, and sample presentation angle range. In addition, embodiments of the invention provide programmable duty cycle logic. In a specific embodiment programmable duty cycles illustratively include idle, low speed, and full throttle. In specific inventive embodiments automated delivery controls for aerosol applications are provided.

Embodiments of the inventive engine evaluation tool primarily use three approaches to introduce cleaners for reducing intake valve deposits for gasoline direct injection and port fuel injection engines. In a first approach, a cleaner is added into an airstream as the airstream enters the intake and flows through the air duct and past the test surface to effect cleaning. In this first approach the cleaner may be added by aspiration, pump sprayer, aerosol propellant, compressed gas, or other means to atomize or disperse the cleaning fluid. The first approach is equivalent to those commonly used to service an actual engine with an aerosol spray carburetor or throttle body cleaner. The second approach is to add a cleaning fluid by suction into an air duct, which may be done by introducing a tube between a vented container of cleaning fluid and the airstream within the air duct. The resulting vacuum will draw fluid into the duct and distribute it over the test specimen, potentially cleaning the surface. The equivalent of the second approach to an actual engine service is the vacuum intake cleaner commonly used for retail fuel system services. The third approach is to add detergent to the fuel itself which is then sprayed onto the test surface to effect cleaning. The equivalent to the third approach commonly used by consumers is a pour-in fuel additive added to a tank of fuel to enhance deposit cleaning. The first two approaches to introducing a cleaner are applicable to both engines using traditional port fuel injectors and newer direct injector system, while the third approach is applicable only to engines with port fuel injectors.

Figure 3:
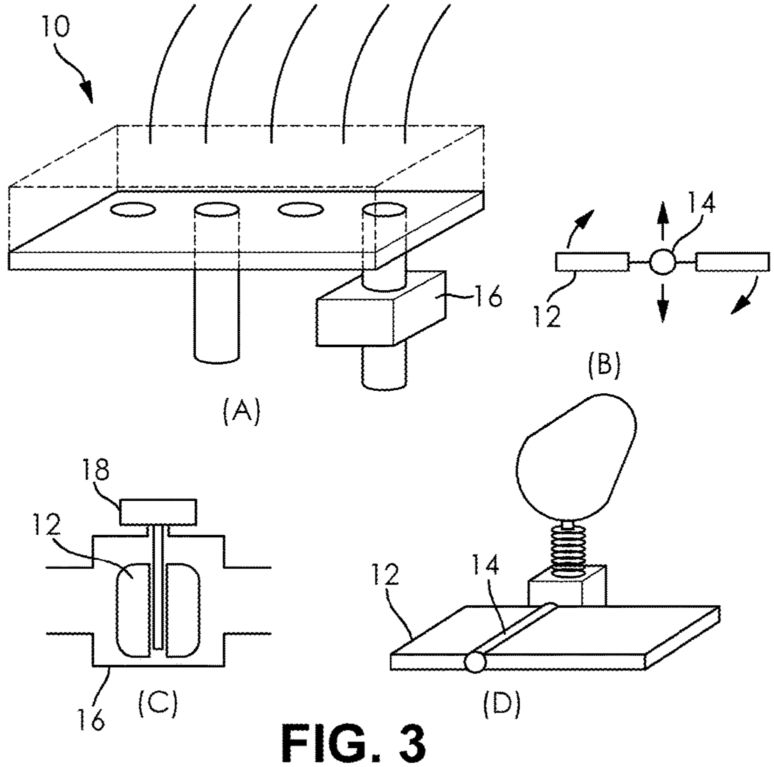
FIG. 3 illustrates the components of a system for GDI benchtop testing employing a flat metallic test specimen attached to a shaft to rotate within the airstream in accordance with embodiments of the invention.

FIG. 3 illustrates an embodiment of a system 10 for GDI benchtop testing using a flat metallic test specimen 12 attached to a shaft 14 to rotate within the airstream. The test surface 12 is heated to approximately 100-400° C. using radiant heat, conduction, thin film, or other heating method to simulate the conditions within a gasoline engine. The test surface 12 is rotated in housing 16 to simulate the pulse of air in an actual engine as the valve is opened and closed. The speed of rotation may be changed with motor 18 in conjunction with air speed to simulate engine operating conditions.

Figure 4:
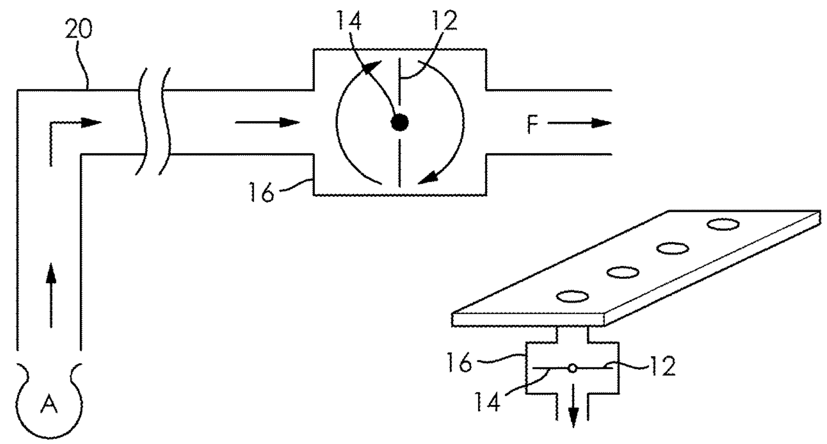
FIG. 4 is a functional view of the components of a system for GDI benchtop testing of FIG. 3 in accordance with embodiments of the invention.

FIG. 4 is a schematic outline of the air flow through the embodiment of the GDI benchtop testing device of FIG. 3. A vacuum source (V) reduces air pressure drawing in air that flows from left to right beginning at the air intake at location A, through a duct 20 designed to similar dimensions as an engine intake manifold past the rotating test specimen 12 and out through an exhaust.

Figure 5:
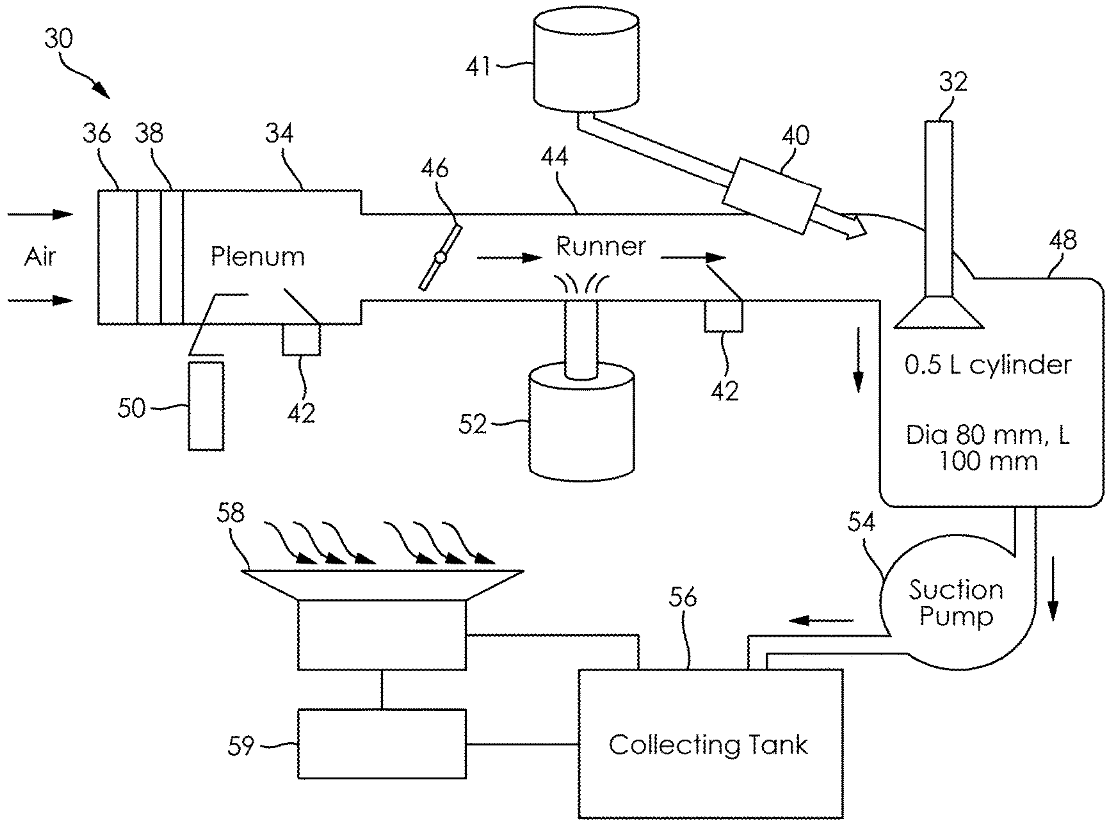
FIG. 5 is functional block diagram depicting an embodiment of a system for GDI benchtop testing using an actual intake valve test specimen.

FIG. 5 is a functional block diagram depicting an embodiment of a system 30 for GDI benchtop testing using an actual test specimen—intake valve 32, thereby replacing the rotating test surface 12 of the embodiment described in FIG. 3 and FIG. 4 with an actual intake valve 32. Because intake valve deposits are a primary concern with gasoline engines, using an actual intake valve maintains the geometry and metallurgy where these deposits typically form. Air is drawn into the plenum 34 through an air filter 36 past a MAF (Mass Air Flow) sensor 38 that coordinates the electrically controlled fuel injector 40 (also duplicating a component of a gasoline engine) with the air flow. The fuel injector 40 is fed gasolines from the fuel tank/fuel pump 41. Pressure sensors 42 are used to determine air flow rate and to aid in adjustment. Between the plenum and the runner 44 is a butterfly valve 46 to control the air flow rate similar to the throttle body or carburetor of a gasoline engine. Plenum 34, runner 44, and cylinder diameters, lengths and volumes 48 are chosen equivalent to the dimensions found in one cylinder of a gasoline engine. The additive injector 50 in the plenum 34 may be electrically actuated or timed. The additive injector 50 may also be manually controlled as would typically be the case when servicing an automobile engine. The vacuum aspirated additive 52 that enters the runner 44 may be introduced under pressure or may depend on the vacuum to introduce the liquid additive. The electrically controlled fuel injector 40 is positioned to spray onto the intake valve 32 similar to a port fuel injected engine. The suction pump 54 creates the vacuum and delivers liquids, fuel, solvent, and/or cleaning compounds to a waste collection tank 56. A fume hood or exhaust system 58 is used to dissipate exhaust and fumes from the test set up system 30. In some inventive embodiments, the collection tank 56, fume hood or exhaust system 58, or both are in fluid communication with a combustor 59. The combustor 59 operative to combust any residual fuel exhausted and thereby reduce the flammability hazard of the system 30. In still other embodiments, the combustor 59 is present in lieu of the collecting tank 56.

Figure 6:
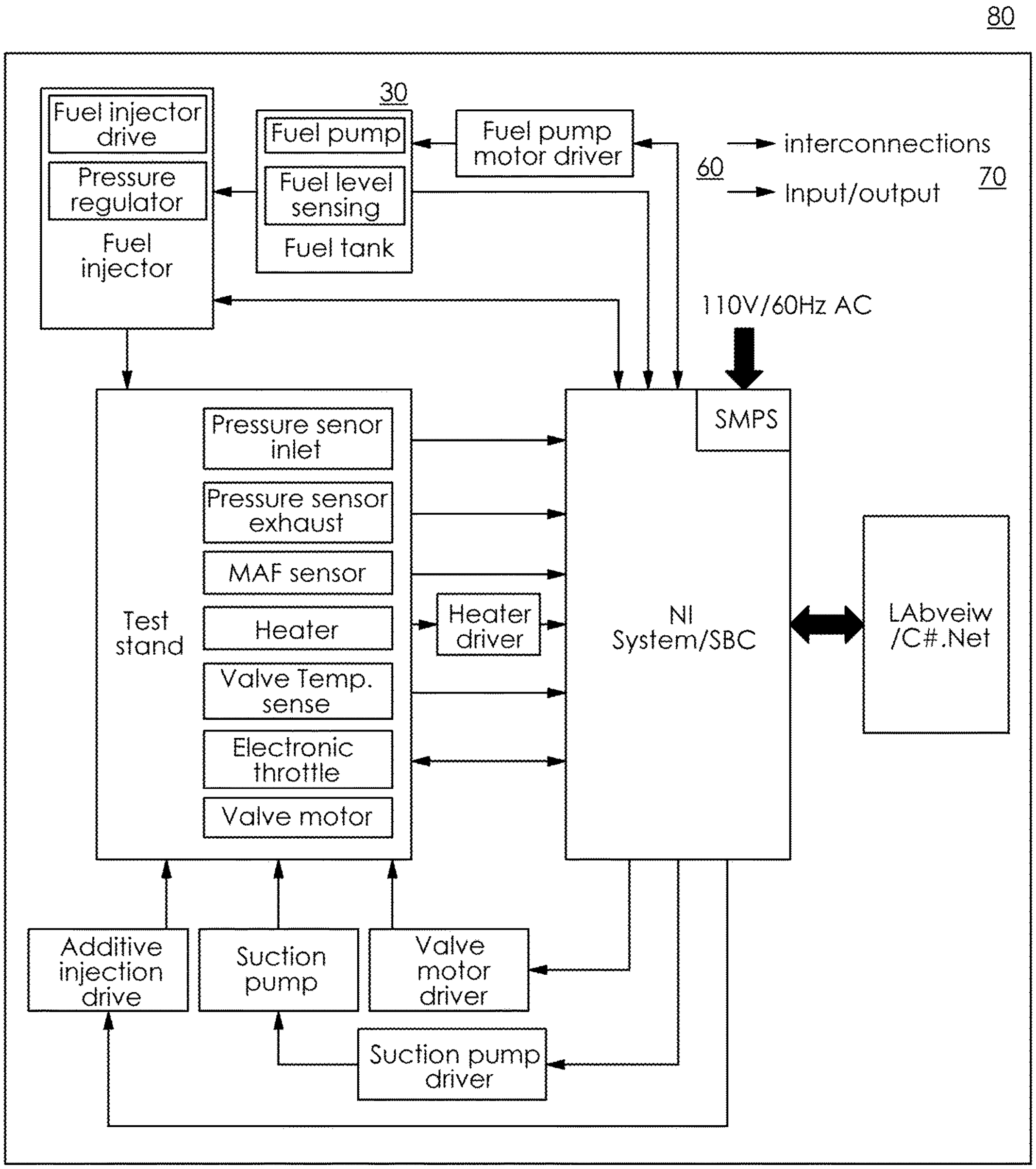
FIG. 6 is a functional block diagram depicting an overall system incorporating the GDI benchtop testing system of FIG. 5 with electrical and computerized controls operating in conjunction with a graphical user interface and control program in accordance with embodiments of the invention.
Figures 1, 7A:
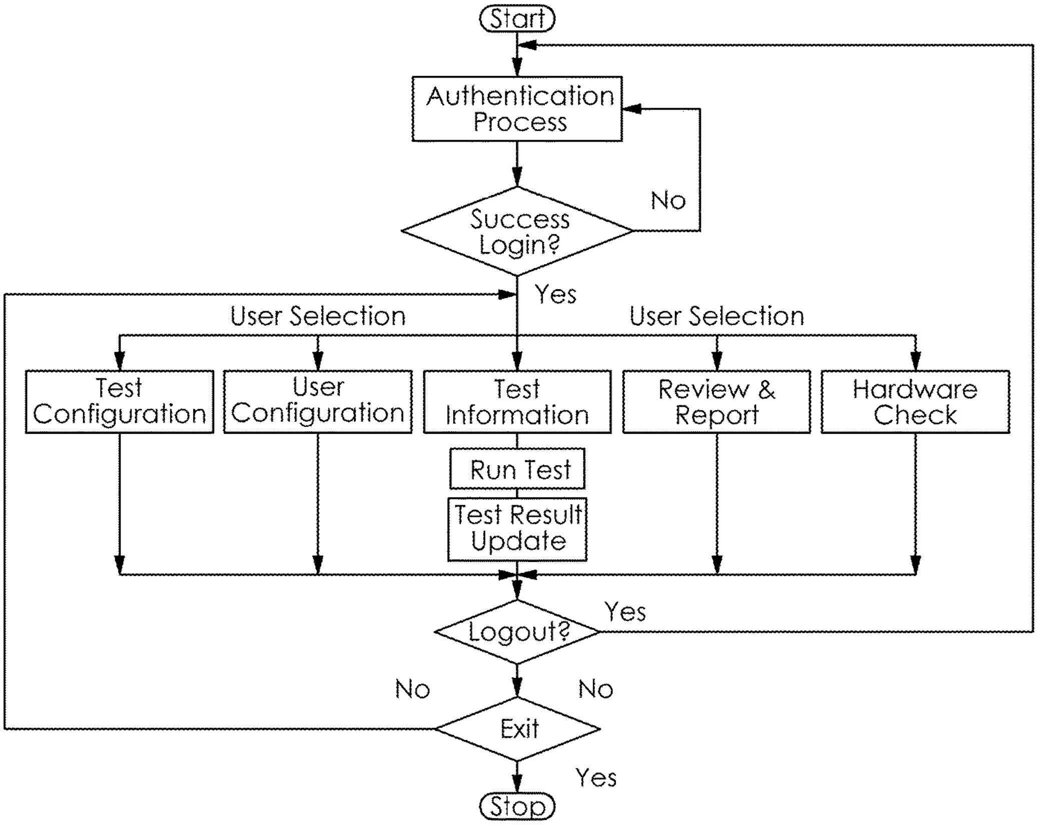
FIGS. 7A-7H are a series of flowcharts detailing the methods of operation of embodiments of the components and system for evaluating the delivery and effectiveness of engine performance chemicals and products for reducing intake valve deposits for gasoline direct injection and port fuel injection engines.
Figures 1, 7B:
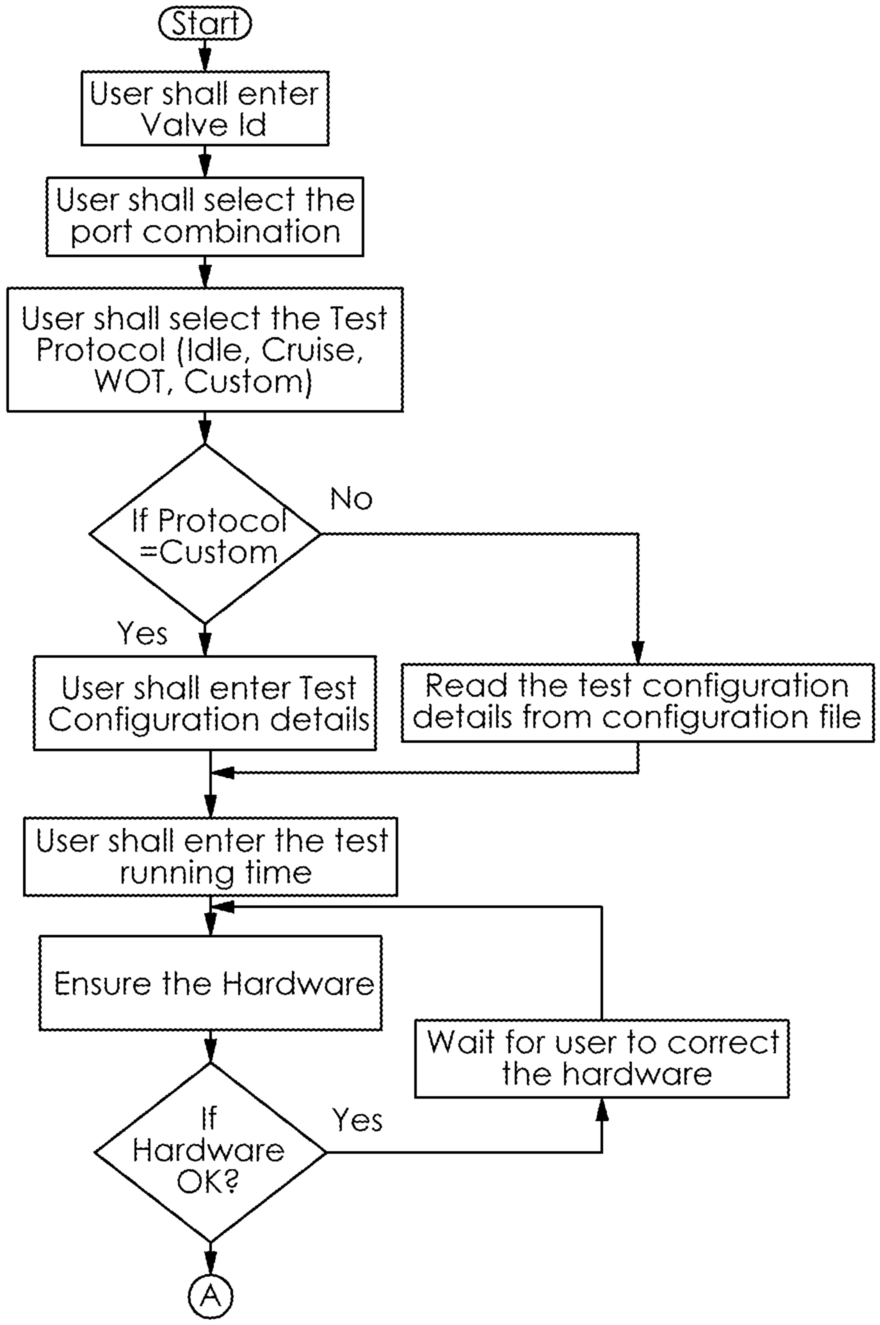
Figures 2, 7B:
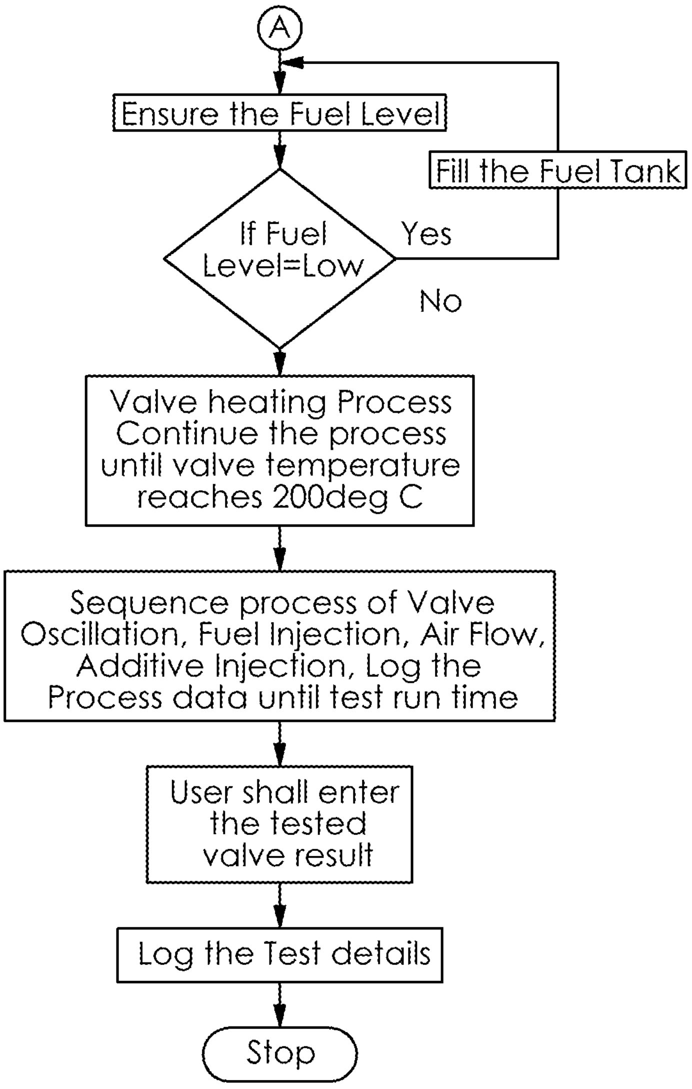
Figure 7C:
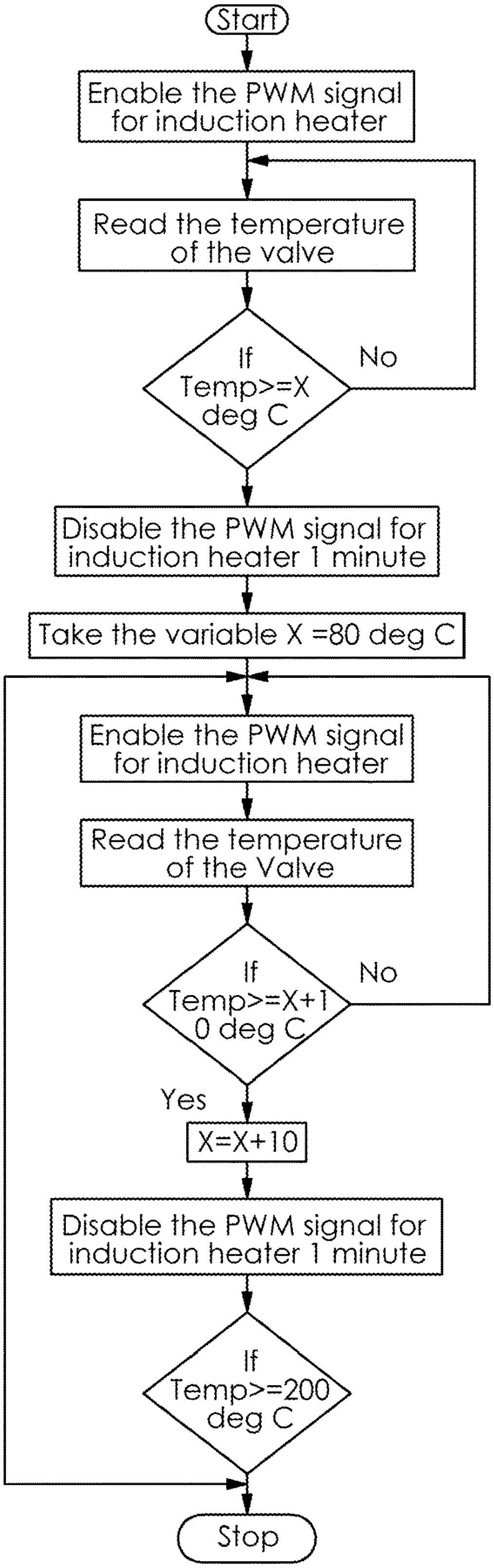
Figure 7D:
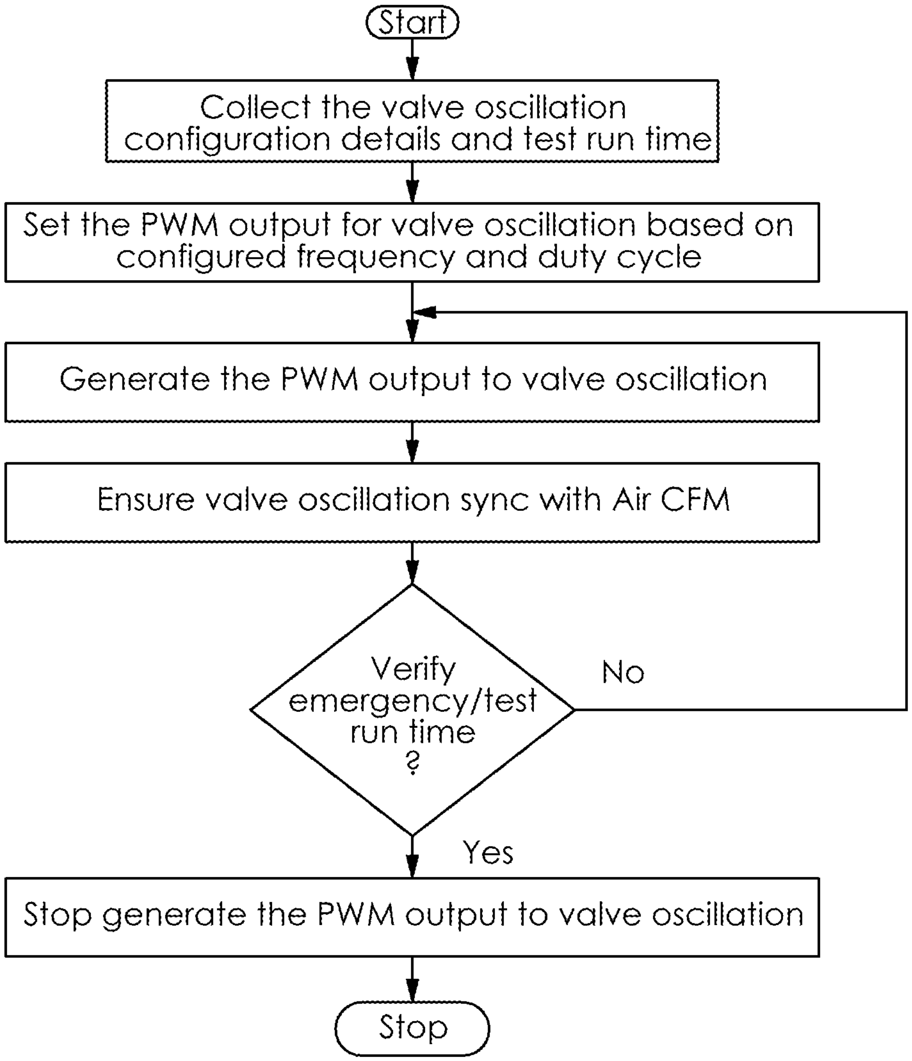
Figure 7E:
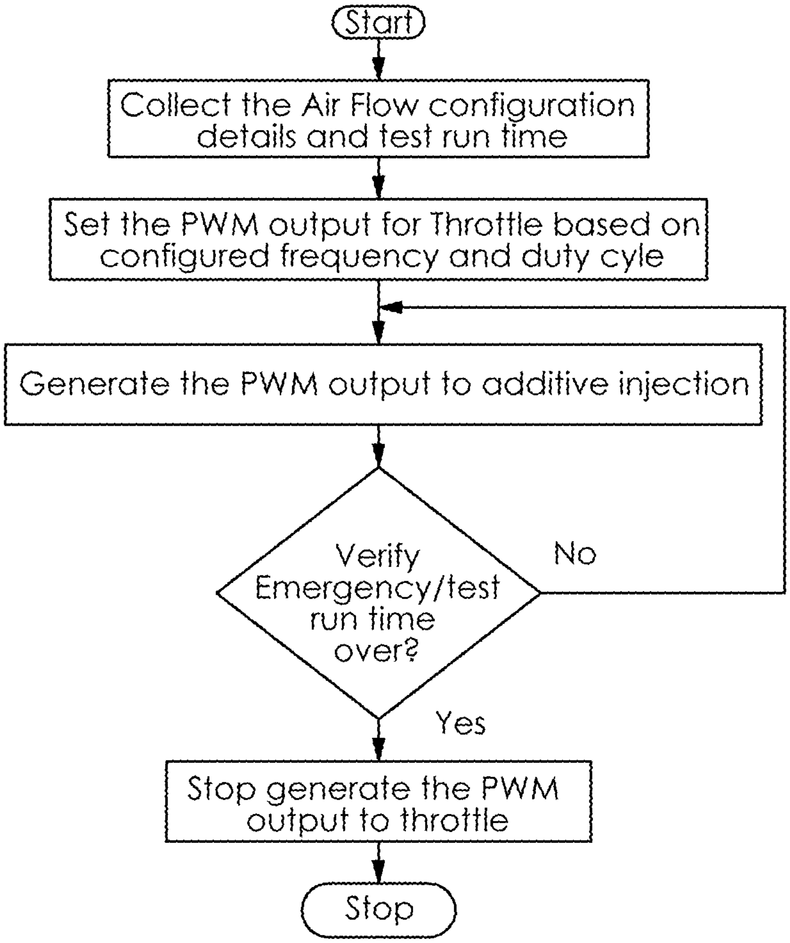
Figure 7F:
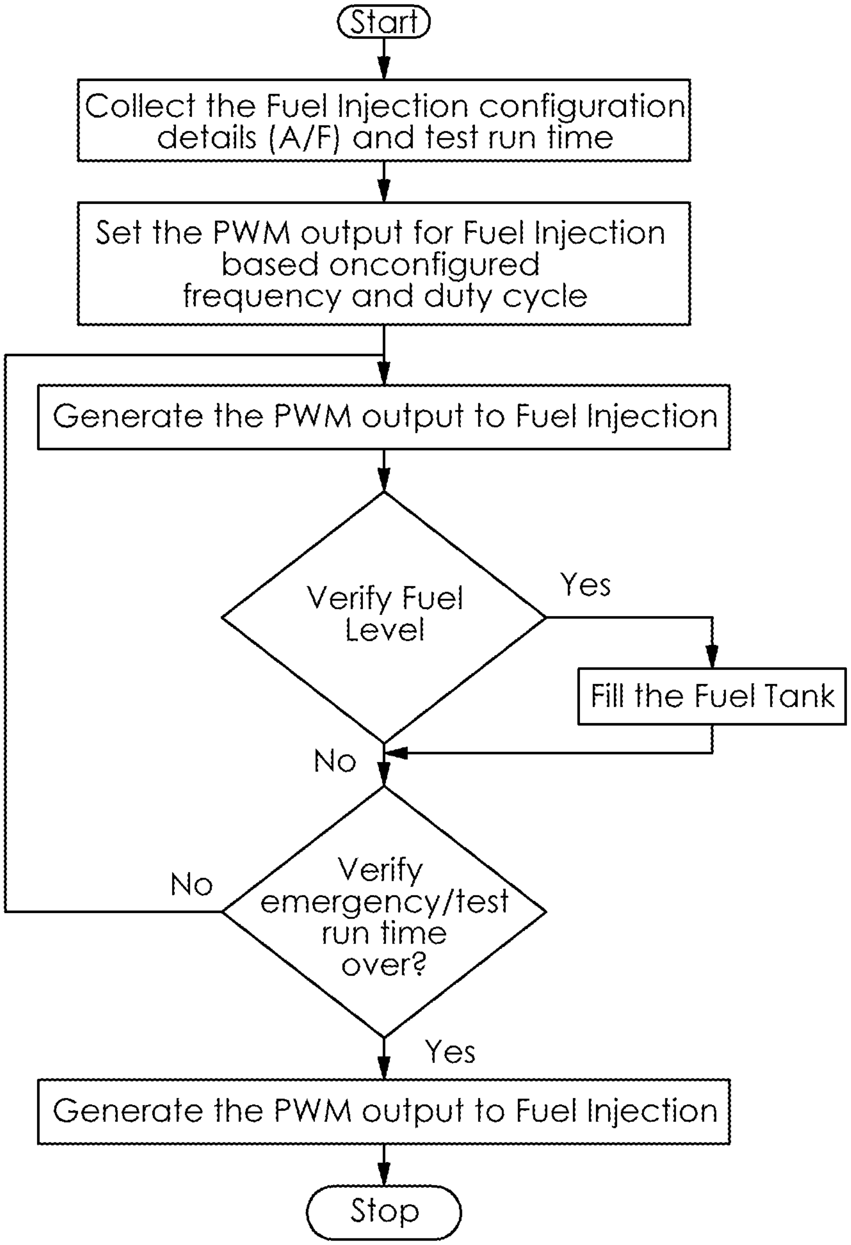
Figure 7G:
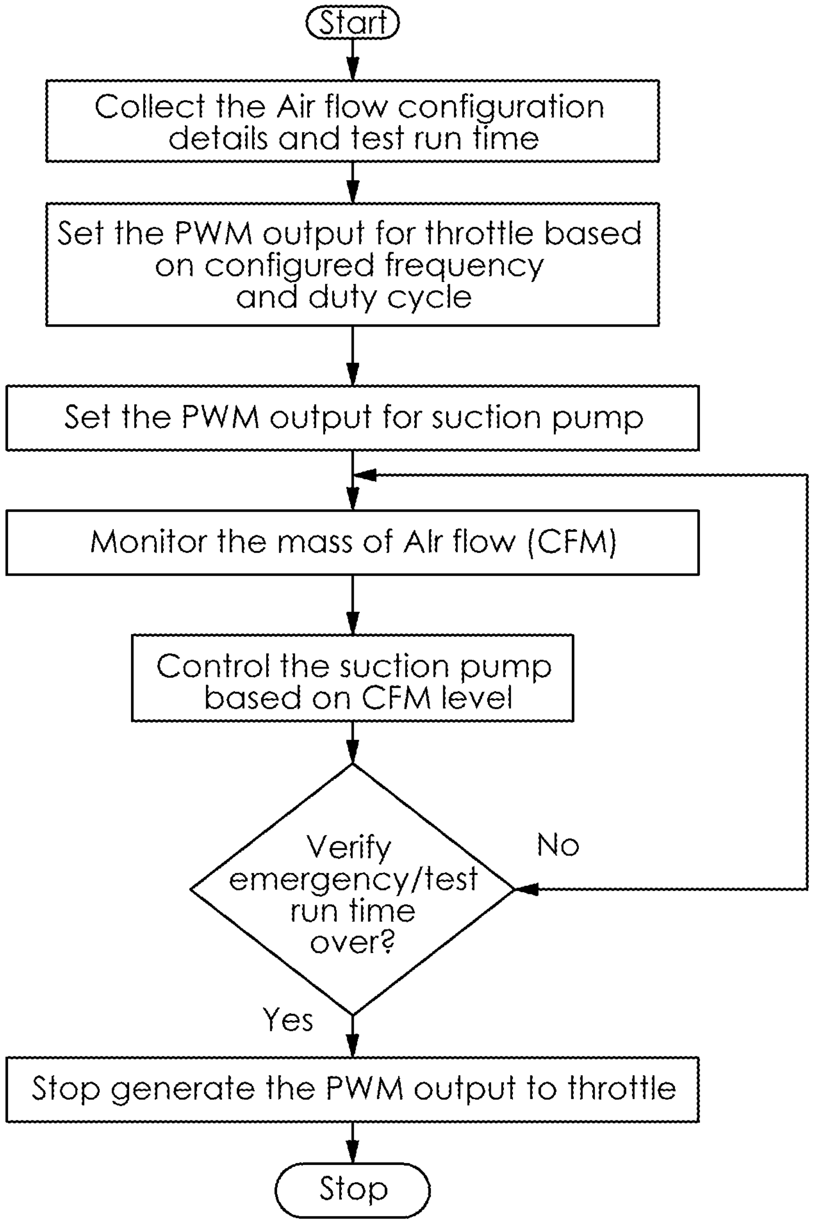
Figure 7H:
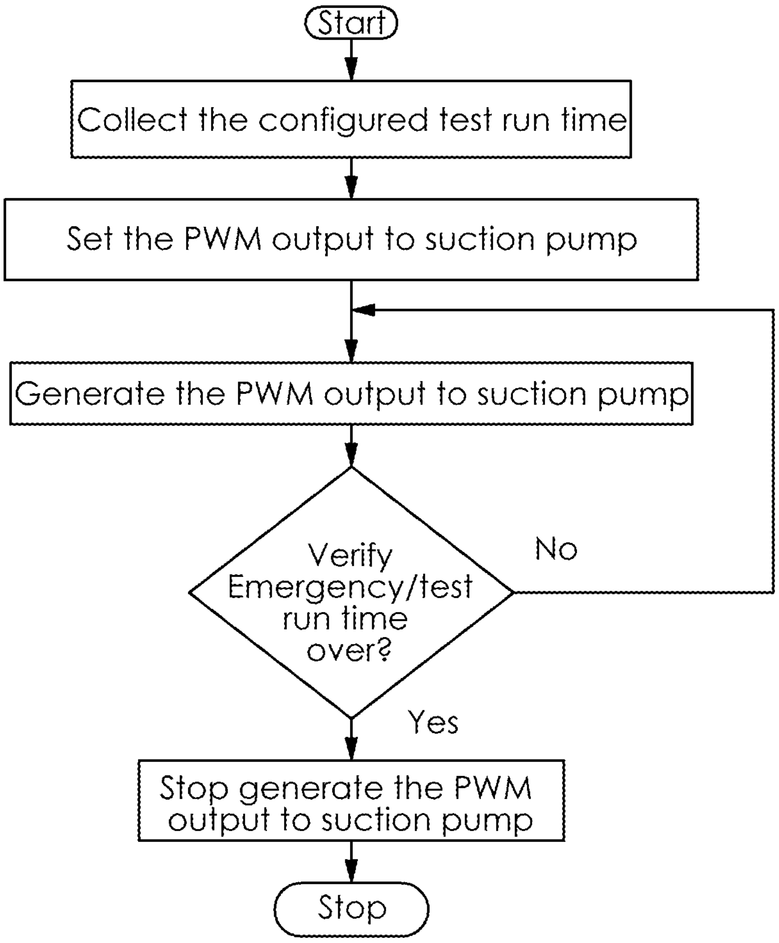

FIG. 6 is a functional block diagram depicting an overall system 80 incorporating the GDI benchtop testing system 30 of FIG. 5 with electrical and computerized controls 60 operating in conjunction with a graphical user interface and control program 70. The overall system 80 is electrically controlled and computer driven to allow unattended operation and allows for overall control of test parameters.

FIGS. 7A-7H are a series of flowcharts detailing the methods of operation of embodiments of the components and system for evaluating the delivery and effectiveness of engine performance chemicals and products for reducing intake valve deposits for gasoline direct injection and port fuel injection engines.

EXAMPLES

Example 1

Figure 8:
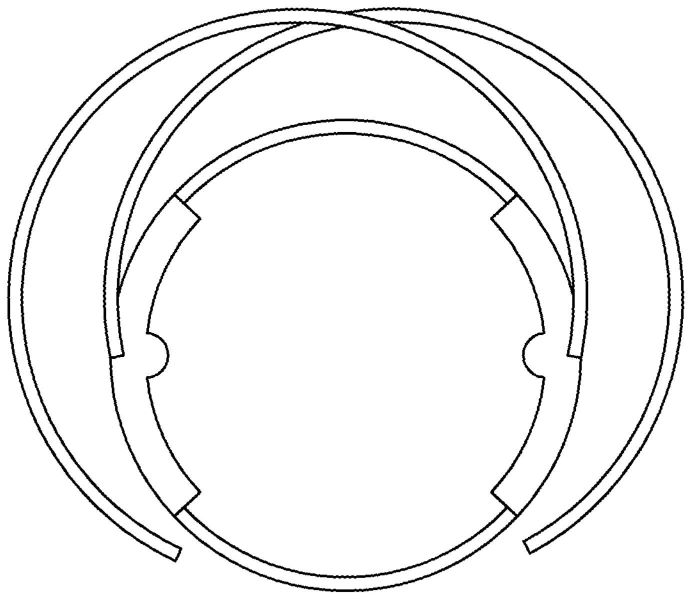
FIG. 8 is a picture of a thin film heater source for valve heating in accordance with an embodiment of the invention.
Figure 9A:
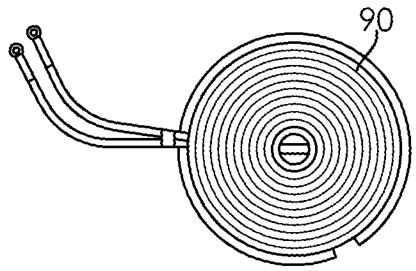
FIGS. 9A-9C illustrate an induction heating element, and the placement of the induction heating element under the valve in a metal housing with temperature sensors, respectively in accordance with embodiments of the invention.
Figure 9B:
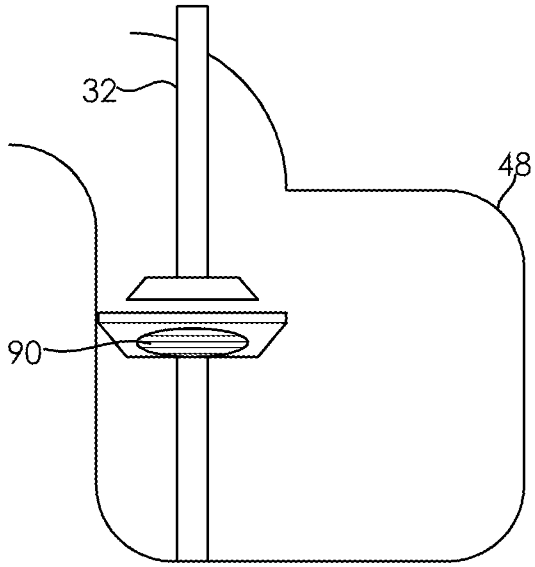
Figure 9C:
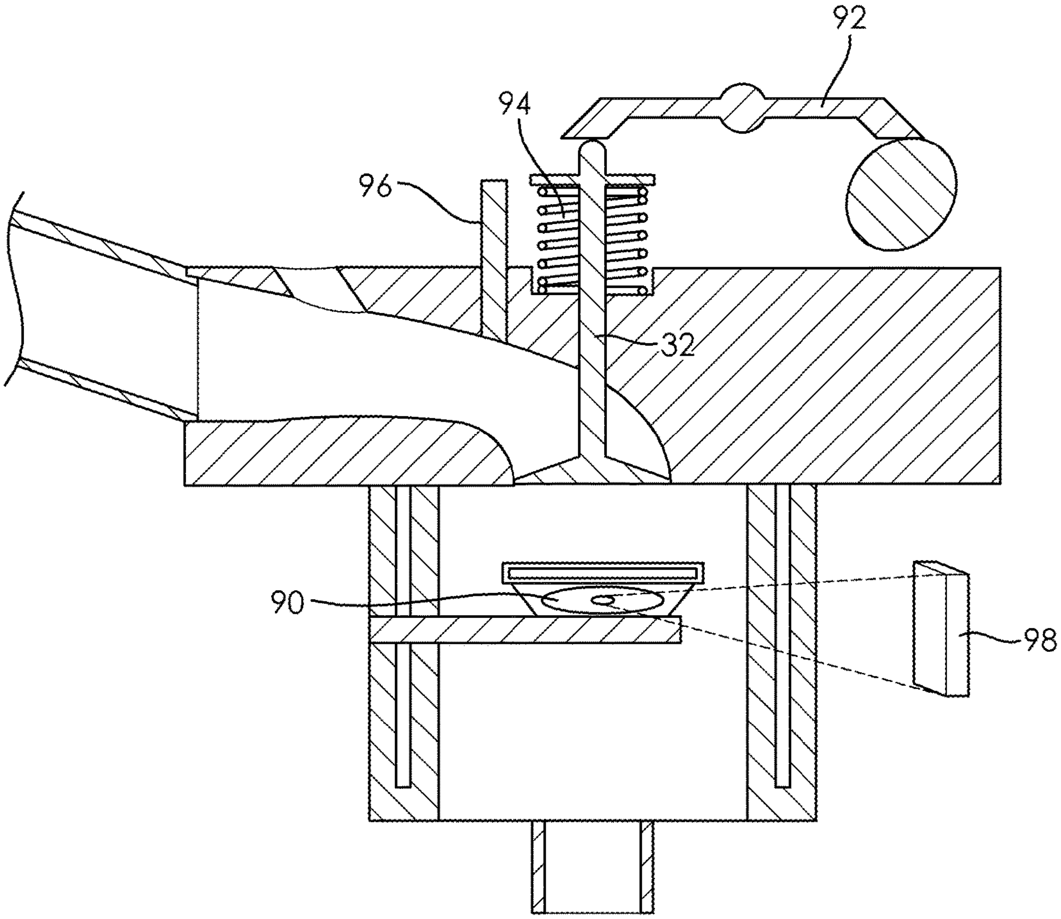

A test piece (carbon deposited valve) is placed in test stand, and heated up to a temperature of 200° C. with a temperature test range of −75° C. to 200° C. with a step size of 10° C. and subject to to-fro motion at 2500 revolutions per minute (RPM). A mixture of air, additive, and fuel is supplied through inlet runners into the chamber where the valve is held. The valve should not be disturbed at any point of time during temperature measurement or heating. Heating of the valve may be accomplished with a thin film heater source as shown in FIG. 8. FIGS. 9A-9C illustrate an induction heating element 90, and the placement of the induction heating element 90 under the valve 32 in a metal housing 48 with temperature sensors (96, 98). In a specific embodiment the temperature sensors (96, 98) are non-contact sensors able to measure moving objects and detect temperatures up to 500° C. Rocker arm 92 in conjunction with the bias spring 94 actuates the valve 32 up and down.

Example 2

Fuel prior to use in test set up injector is "dirty-upped" by using untreated fuel that tends to build deposits on the valve.

Example 3

A dirty-up process for fuel injected into test set up using engine oil aspirated through the injector, potentially mixed with fuel at a concentration ranging from 0% to 100%.

The engine oil may be previously used or treated so that it contains suspended carbon and other contaminants that may contribute to valve deposits.

The foregoing description is illustrative of particular embodiments of the invention, but is not meant to be a limitation upon the practice thereof. The following claims, including all equivalents thereof, are intended to define the scope of the invention.

The invention claimed is:

1. A system for evaluating the delivery and effectiveness of engine performance products in removing carbon deposits from a test specimen with pre-defined carbon content, the system comprising:

a test stand adapted for use with said test specimen, said test specimen in the form of a flat metallic surface that simulates an intake valve;

a motor driven shaft attached to said flat metallic surface, said shaft rotated by a motor within an airstream, the airstream introduced into a duct of a housing containing said flat metallic surface;

a heating source to heat said flat metallic surface;

a vacuum source that draws the airstream through said duct configured to simulate an engine intake manifold past said rotating flat metallic surface and out through an exhaust;

a set of electrical controls to control a set of system parameters of said test stand, where said set of system parameters simulate intake valve and combustion chamber conditions of an engine combusting gasoline; and a graphical user interface and a set of computerized controls to configure and monitor the set of system parameters.

2. The system of claim 1 wherein said set of system parameters comprise one or more of: temperature, pressure, airflow rate, humidity, and proportions of fuel, air, and additive mixture.

3. A process for evaluating the delivery and effectiveness of engine performance products using the system of claim 1, said process comprising:

placing a test specimen in said test stand;

selecting a test protocol with said graphical user interface;

setting a test running time;

adding fuel to a fuel tank of the system as required for the selected test protocol and test running time;

warm up system to a required temperature;

sequence process of one or more of valve oscillation, fuel injection, airflow, or additive injection;

log process data obtained until end of test run time; and evaluate test results.

4. The system of claim 1 further comprising a fume hood or an exhaust system to dissipate exhaust and fumes from said system.

5. The system of claim 4 further comprising a combustor in fluid communication with said fume hood or said exhaust system to combust fuel present in the fumes.

6. The system of claim 5 wherein said combustor is a burner.

7. The system of claim 5 wherein said combustor is an engine.

8. The system of claim 5 wherein said combustor is an industrial flare.

9. A system for evaluating the delivery and effectiveness of engine performance products comprising:

a test stand adapted for use with a test specimen, where said test specimen is an intake valve coated with a pre-defined carbon content;

a set of electrical controls to control a set of system parameters that simulate intake valve and combustion chamber conditions of an engine;

a graphical user interface and a set of computerized controls to configure and monitor the set of system parameters;

wherein said test stand further comprises:

a plenum in fluid communication with the proximal end of a runner, where air is drawn in to said plenum through an air filter past a mass air flow (MAF) sensor, said MAF coordinates operation of an electrically controlled fuel injector positioned at the distal end of said runner;

a fuel tank configured with a fuel pump to feed fuel to said fuel injector to inject the fuel through said intake valve;

a set of pressure sensors to determine a flowrate of the air in said runner, and where said set of sensors control a butterfly valve in said runner to set the flowrate; and an additive injector in fluid communication with said plenum.

10. The system of claim 9 further comprising a vacuum aspirated additive introduced into said runner, and a suction pump that creates the vacuum and delivers liquids; fuel, solvent, and cleaning compounds to a waste collection tank.

11. The system of claim 9 wherein said set of system parameters comprise one or more of: temperature, pressure, airflow rate, humidity, and proportions of fuel, air, and additive mixture.

12. The system of claim 9 wherein said system further comprises programmable duty cycle logic.

13. The system of claim 9 further comprising a fume hood or an exhaust system to dissipate exhaust and fumes from said system.

14. The system of claim 13 further comprising a combustor in fluid communication with said fume hood or said exhaust system to combust fuel present in the fumes.

15. The system of claim 14 wherein said combustor is a burner.

16. The system of claim 14 wherein said combustor is an engine.

17. The system of claim 14 wherein said combustor is an industrial flare.

* * * * *